United States Patent [19]

Kinnan

[11] Patent Number: 4,762,151
[45] Date of Patent: Aug. 9, 1988

[54] BLANK PLUG ASSEMBLY

[75] Inventor: Frank R. Kinnan, Camas Valley, Oreg.

[73] Assignee: L & F Company, Camas Valley, Oreg.

[21] Appl. No.: 882,685

[22] Filed: Jul. 7, 1986

[51] Int. Cl.⁴ .............................................. F16L 55/12
[52] U.S. Cl. ........................................ 138/89; 220/235
[58] Field of Search .................. 138/89, 90, 91, 92, 138/96 R; 220/235, 237, 234, 236, 233; 215/359; 4/295; 166/191, 192

[56] References Cited

U.S. PATENT DOCUMENTS

| 100,115 | 2/1870 | Brown | 220/237 |
|---|---|---|---|
| 2,182,051 | 12/1939 | Kurth | 220/235 |
| 2,603,347 | 7/1952 | Fish | 220/235 |
| 2,720,893 | 10/1955 | Foreman | 220/235 |
| 2,812,025 | 11/1957 | Teague et al. | 166/191 |
| 3,017,053 | 1/1962 | Mitchell | 220/235 |
| 3,371,716 | 3/1968 | Current | 166/118 |
| 3,618,809 | 11/1971 | Martino | 138/89 |
| 3,618,811 | 11/1971 | Martino | 138/89 |
| 3,667,640 | 6/1972 | Morrow | 138/89 |
| 4,188,675 | 2/1980 | Ast | 220/237 |
| 4,303,101 | 12/1981 | Tholen | 138/89 |
| 4,585,033 | 4/1986 | Westman | 138/89 |

*Primary Examiner*—Henry J. Recla
*Assistant Examiner*—L. J. Peters
*Attorney, Agent, or Firm*—Kolisch, Hartwell & Dickinson

[57] ABSTRACT

A plug assembly for sealing a conduit. The assembly includes an annular, deformable sealing member, bound by an inner surface that includes opposed convexly curved surface portions. Opposed disks, each having an annular boundary edge, are positioned with the boundary edges of the disks underlying the inner surface portions of the sealing member. These disks are drawn together to produce radial expanding of the sealing member in regions where the member overlies the disks.

6 Claims, 1 Drawing Sheet

BLANK PLUG ASSEMBLY

BACKGROUND AND SUMMARY OF THE INVENTION

This invention relates to a plug assembly. More particularly, this invention relates to such an assembly for sealing conduits to prevent transmission of fluids therethrough.

When installing underground utilities, underground vaults are usually constructed at regular intervals along a distribution route. These vaults are interconnected by conduits which may enclose power cables, telecommunications cables, fiber optics, etc. Upon construction of such an underground distribution system, it is generally desirable to install more conduits than are required at the time of construction in order to accommodate future expansion of the facilities without the necessity of digging up roads and property between vaults. It is often desirable that these unused conduits be temporarily sealed until they are needed in order to prevent the conduits from providing passage for gases, liquids, or other contaminants and further to prevent insects and animals from passing through, or nesting in, the empty conduits.

It is desirable that any device provided to seal these conduits be easily installable and removable, and provide a positive and long-lasting seal.

Accordingly, it is an object of this invention to provide a simple, reliable, and stable plug assembly which may be installed in a conduit quickly and easily.

It is a further object of this invention to provide a plug which will make an enduring seal in the conduit in which it is installed.

Another object of this invention is to provide a device which seals the conduit sufficiently to prevent the passage of gases and liquids, as well as animals.

Yet another object of this invention is to provide a plug assembly which will accommodate a range of conduit sizes as well as out-of-round conduits.

Another object of this invention is to provide a conduit plug having a connector to retain the end of a pull wire to prevent its loss inside the conduit.

These and other objects and advantages of the present invention will be more readily apparent from a consideration of the following drawings and a detailed description of the preferred embodiment.

DETAILED DESCRIPTION OF THE DRAWINGS

Figure 4:
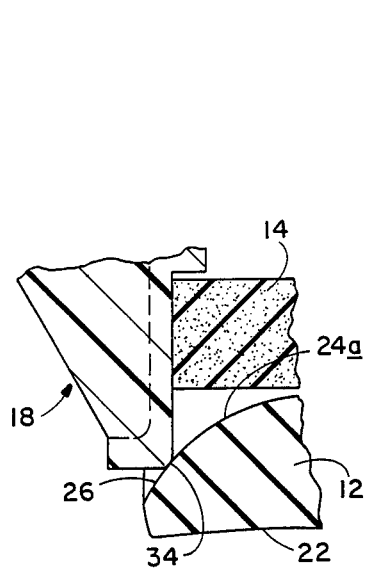
FIG. 4 is an enlarged view of portions of the plug assembly shown in FIG. 2.
Figure 1:
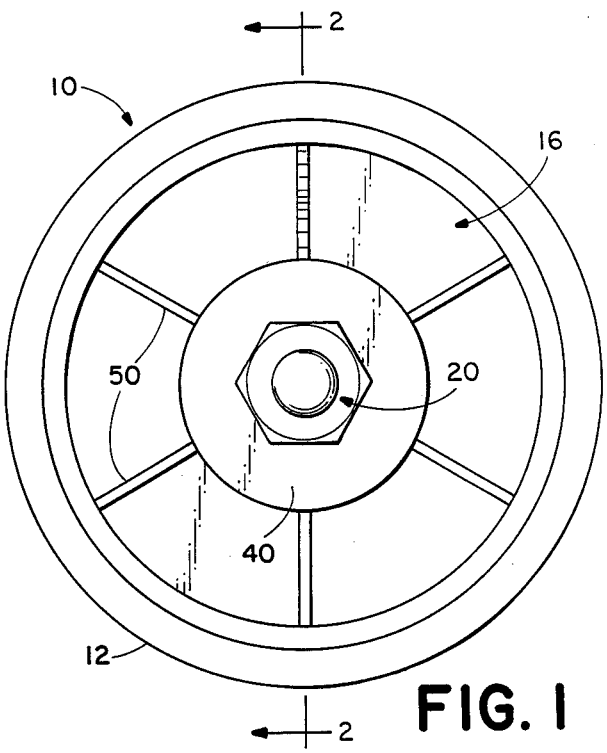
FIG. 1 is a front elevation of a blank plug assembly in accordance with this invention.

Referring now to the drawings, a blank plug assembly constructed according to the invention is illustrated, given the reference numeral 10. In general terms, such comprises an annular sealing member which forms the outer perimeter of the plug assembly, shown at 12. What is referred to as a centering insert is seated within sealing member 12, shown at 14. A pair of opposed disk members or disks 16, 18, form opposite axial ends of the plug assembly. An elongate screw fastener assembly 20 interconnect disk members 16, 18.

Figure 2:
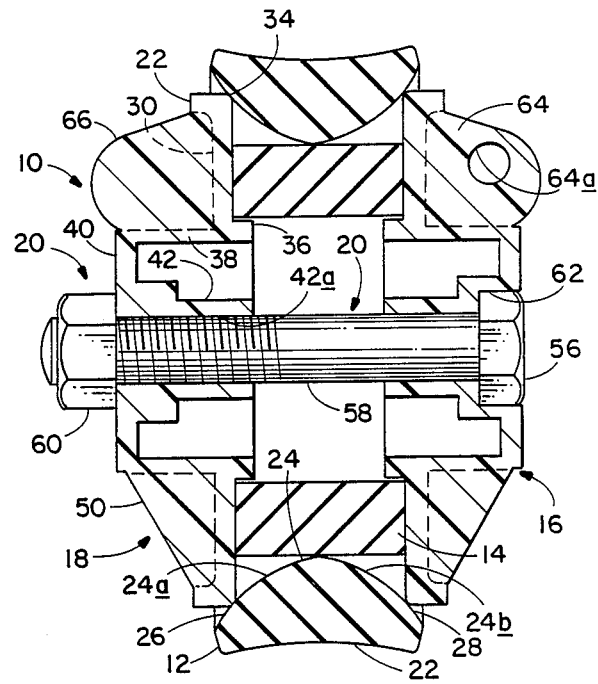
FIG. 2 is a cross section of the blank plug assembly taken along the lines 2—2 in FIG. 1.

Describing in more detail, sealing member 20, such is composed of a relatively stiff but pliable elastomeric material, such as a rubber-like polymer. By reason of its elastomeric composition, the sealing member is deformable to produce when installed tight sealing engagement with the inside of a conduit. The member has an annular outer surface 22, which is the surface that produces the seal, and an annular inner surface 24. With the sealing member in a relaxed state, as shown in FIG. 2, the outer surface may, if desired, be provided with a slight transverse concavity, as illustrated by the cross section of the member shown in FIG. 2. Inner surface 24 comprises a pair of opposed surface portions 24a, 24b which slope toward each other progressing radially inwardly of the member to produce generally a convex profile to the inner surface. These surface portions have matching transverse extent and join with each other midway between opposite axial extremities of the member. The surface portions preferably and in cross section have a curving convexity in regions 26, 28 adjacent but inwardly of opposite axial extremities of the sealing member.

Centering insert 14 may take the form of a short hollow cylindrical segment. Such may be composed of a foamed elastomeric material, whereby such has a sponge-like consistency and is more readily deformable than member 20. The centering insert is unjoined to the sealing member that surrounds it but fits snugly within its interior and functions to center the sealing member during assembly of the parts in the plug assembly.

Disk members 16, 18 have similar constructions. Thus, as can be seen with reference to member 18, each includes an annular plate portion 30 with an inwardly facing surface that forms the inner side of the disk member. Joined to the outer margins of this plate portion and forming the outer perimeter of the disk member is an annular flange portion 32. The outer surface of this flange portion forms an annular boundary edge of the disk. This boundary edge joins with the inner side of the disk through a rounded rim portion 34.

Each disk further has on its inner side and concentrically arranged on the disk, an annular ridge 36.

Forming the outer side of each disk is what is referred to herein as a collar portion 38 terminating in a web expanse 40. Joined to each web expanse is a sleeve portion 42 having an internal bore 42a.

Each disk may further include as an integral part thereof and on its outer side a tab, exemplified by tab 64 for disk 16 and tab 66 for disk 18. Tab 64 includes a bore 64a extending therethrough.

Radially extending ribs 50 forming an integral part of each disk extend outwardly from the collar portion and join with plate portion 30 in the disk and flange portion 32. These function to strengthen the disk and to transmit an axially inwardly directed force applied to the collar portion in the disk to the flange portion which forms the perimeter of the disk.

Fastener assembly 20 includes a bolt having a head 56 and shank 58. The shank is threaded at its free end to receive nut 60. In the case of disk 16, web expanse 40 is recessed as shown in 62 to receive head 56 in a recessed position. The web expanse 40 of the other disk, however, is of flat extent where nut 60 bears thereagainst.

The plug is assembled with disks 16, 18 adjacent opposite axial extremities of sealing member 12. The outer boundary edge of disk 16 lies under surface portion 24b and the outer boundary edge of disk 18 lies under surface portion 24a of the sealing member. Rounded rim portions 34 bear against the inner surface portions of the sealing member where such have convexity, namely, regions 26, 28. During assembly, the centering insert which fits about flange portions 32 of the disks and snugly within the sealing member, serves to facilitate proper positioning of the various parts. The fastener assembly with the bolt thereof inserted through the sleeve portions and nut 60 screwed onto the end of the bolt, holds the disks with such position as described.

Figure 3:
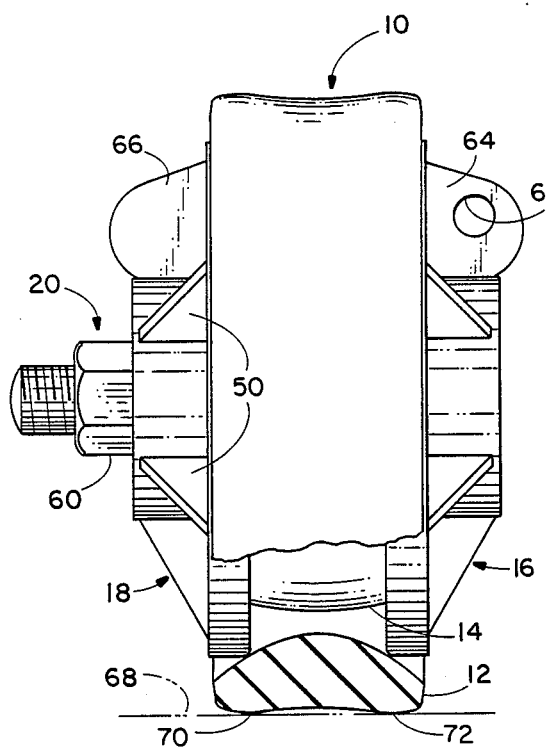
FIG. 3 is a side elevation of the blank plug assembly partly broken away and in its operative position inside a conduit.

To install the plug assembly with such sealing off a conduit, such is placed within the interior of the conduit as exemplified by conduit 68 shown in outline FIG. 3. The nut is tightened on the bolt with the fastener assembly during such tightening functioning as a means drawing the disks toward each other. As the disks move toward each other, and with reference now to FIGS. 3 and 4, their rounded rims bear against and move inwardly over regions 26, 28 causing the sealing member to deform and with outward bulging of the sealing member in regions shown at 70, 72. Such deformation may be accompanied with a flattening of the outer surface of the sealing member as a central region of the sealing member is pulled outwardly with the deformation producing regions of contact 70, 72. This movement is permitted since there is no restriction offered by the centering insert which is detached from the sealing member. The seal that results is extremely tight. Because of the axially spaced annular regions 70, 72 of high pressure contact that are produced, the seal readily adapts itself to conduits having irregularities in the circumferential extent of their inner surfaces.

An unused conduit is sometimes installed with a "pull wire" extending therethrough, which, at a later date, may be employed in the pulling of a cable through the conduit. Bore 64a in tab 64 may be utilized in looping or tying such a pull wire to the plug assembly closed by the assembly. In this way, and at some later date, the pull wire is made readily accessible with removal of the plug assembly. Tab 66 which forms part of the other disk member may be utilized in manually anchoring the disk member during initial tightening of nut 60 on to bolt 54.

It can be appreciated that the plug assembly just described has few parts and is simple to use. The double regions of high pressure sealing contact afforded by regions 70, 72 provide stability to the plug assembly against forces which may tend to dislodge it while it is installed.

While the invention has been particularly shown and described with reference to the foregoing preferred embodiment, it will be understood by those skilled in the that other changes in form and detail may be made therein, without departing from the spirit and scope of the invention as defined in the appended claims.

It is claimed and desired to secure by Letters Patent:

1. A plug assembly for sealing a conduit comprising:
   an annular, elastomeric, deformable sealing member having an annular outer surface adapted to be brought into sealing engagement at two axially-spaced, annular regions of contact with the inside surface of a conduit and annular inner surface, said inner surface including opposed surface portions that slope toward each other progressing radially inwardly of the member;
   a pair of substantially parallel, opposed disks, each having an annular boundary edge and positioned with the boundary edge of one disk underneath one of said surface portions and thus overlayed by the sealing member adjacent one axial extremity of the member and with the boundary edge of the other disk underneath the other of said surface portions and thus overlayed by the sealing member adjacent the other axial extremity of the member, wherein each of said disks has an inner side and a rounded rim joining the boundary edge of the disk and its inner side, and the rim of a disk engages a sloping surface portion of the sealing member, and each sloping surface portion where engaged by a disk rim in cross section has a convex curvature;
   an annular elastomeric centering insert disposed concentrically with and detached from said sealing member and contacting the inner surface of said sealing member, and wherein each of said inner sides includes a centered annular ridge snugly fitted within said centering insert; and
   means for drawing said disks toward each other with radial expanding of said sealing member in regions where the member overlies said disk.

2. The assembly of claim 1, wherein said outer surface, in cross section, is concave with the member in a relaxed state.

3. The assembly of claim 1, wherein each of said disks has an outer side and said outer side includes a plurality of radial ribs attached thereto, and said means for drawing said disks together comprises a screw fastener with end extremities operatively bearing on said ribs.

4. The plug assembly of claim 1, wherein each disk has an annular flange forming the perimeter thereof, the boundary edge of a disk being the outer surface of its said flange, the flange of a disk terminating in a rounded rim which engages a sloping surface portion of the sealing member, each disk further including a collar and connected radial rib joining with the disk's annular flange, and said means for drawing the disks together comprises fastener means engaging the collars of the disks.

5. The assembly of claim 1, wherein said opposed surface portions have matching transverse extent and join with each other midway between opposite axial extremities of the member.

6. A plug assembly for sealing a conduit comprising:
   an annular, elastomeric, deformable sealing member having an annular outer surface adapted to be brought into sealing engagement at two axially-spaced, annular regions of contact with the inside surface of the conduit and an annular inner surface, said inner surface including opposed surface portions that in cross section have convex curvature and that slope toward each other progressing radially inwardly of the member, said surface portions having matching transverse extent and joining with each other midway between opposite axial extremities of the sealing member;
   a pair of substantially parallel opposed disks, each having an annular flange forming the perimeter thereof and the outer surface of the flange forming an outer boundary edge for the disk, the flange of the disk terminating in a rounded rim, the boundary edge of one disk lying underneath one of said surface portions of said sealing member and thus being overlapped by the sealing member adjacent one axial extremity of the member and the boundary edge of the other disk lying underneath the other of said surface portions and thus being overlapped by the sealing member adjacent the other axial extremity of the member, the rounded rims of the disks engaging the convexly curved sloping surface portions of the sealing member;

each of the disks further including a collar concentrically located thereon and radial ribs joining with the collar and joining with the annular flange of the disk;

an annular elastomeric centering insert disposed concentrically with and detached from said sealing member and contacting the inner surface of said sealing member, and wherein each of said inner sides includes a centered annular ridge snugly fitted within said centering insert; and means for drawing said disks toward each other with radial expanding of said sealing member in regions where the member overlies said disks, said means comprising a screw fastener extending through the plug assembly and having end extremities bearing on the collars of said disks.

* * * * *